US007912227B2

(12) United States Patent
Kim et al.

(10) Patent No.: US 7,912,227 B2
(45) Date of Patent: Mar. 22, 2011

(54) SOUND REPRODUCING SCREEN FOR AN ULTRASONIC CONVERTING AND REPRODUCING METHOD

(75) Inventors: Jung-ho Kim, Yongin-si (KR); Jun-tai Kim, Yongin-si (KR); Andrey V. Shanin, Moscow (RU); Oleg V. Rudenko, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1441 days.

(21) Appl. No.: 11/311,400

(22) Filed: Dec. 20, 2005

(65) Prior Publication Data

US 2006/0147065 A1 Jul. 6, 2006

(30) Foreign Application Priority Data

Dec. 20, 2004 (KR) ........................ 10-2004-0108910

(51) Int. Cl.
*H04B 3/00* (2006.01)

(52) U.S. Cl. ................ 381/77; 381/79; 381/80; 381/82; 381/150; 381/111; 381/387

(58) Field of Classification Search .................... 381/77, 381/80, 82, 191, 387, 150, 160, 163, 79, 381/11, 152
See application file for complete search history.

(56) References Cited

U.S. PATENT DOCUMENTS 4,823,908 A 4/1989 Tanaka et al.
6,807,281 B1 * 10/2004 Sasaki et al. .................. 381/111
7,277,767 B2 * 10/2007 Yuen et al. ...................... 700/94
2004/0114770 A1 * 6/2004 Pompei ........................... 381/77
2004/0151325 A1 8/2004 Hooley et al.
2004/0174773 A1 9/2004 Thomenius et al.
2005/0281420 A1 * 12/2005 Sekino et al. ................. 381/191
2006/0057405 A1 * 3/2006 Kagawa ........................ 428/458

FOREIGN PATENT DOCUMENTS

EP 0779108 A2 12/1995
JP 04-290400 A 10/1992
JP 11-262084 A 9/1999
JP 2002-191098 A 7/2002
WO 00/18182 A1 3/2000

OTHER PUBLICATIONS

Communication (Notice of Office Action) dated Oct. 5, 2010 issued in counterpart Japanese Application No. 2005-367225.

* cited by examiner

*Primary Examiner* — Devona E. Faulk
*Assistant Examiner* — Disler Paul
(74) *Attorney, Agent, or Firm* — Sughrue Mion, PLLC

(57) ABSTRACT

A sound reproducing screen for an ultrasonic converting and reproducing method wherein a sound signal is carried on the ultrasonic wave which is transmitted via the screen which has a lattice structure in which a plurality of cells is continuously arranged. Using the screen, the sound signal can be divided from the ultrasonic wave, so that the sound signal can be reproduced. A cell structure of the screen is thus provided for converting the ultrasonic wave into the sound signal by ultrasonic conversion and reproduction which is simple to make and which has a maximum conversion efficiency. Accordingly, an efficiency of reproducing the sound source in a low frequency band as well as a high frequency band is superior, and a realistic three-dimensional sound system can be implemented.

13 Claims, 7 Drawing Sheets

SOUND REPRODUCING SCREEN FOR AN ULTRASONIC CONVERTING AND REPRODUCING METHOD

CROSS-REFERENCE TO RELATED APPLICATIONS

This application claims priority from Korean Patent Application No. 10-2004-0108910, which was filed on Dec. 20, 2004, the entire content of which is incorporated herein by reference.

BACKGROUND OF THE INVENTION

1. Field of the Invention

Apparatuses consistent with the present invention relate to reproducing sound signals which are carried over ultrasonic waves, and in particular, to a sound reproducing screen for an ultrasonic converting and reproducing method.

2. Description of the Related Art

Among methods of transferring sound signals over a long distance, methods of transmitting sound signals carried on ultrasonic waves have been developed. Such methods were first developed for military purposes such as a submarine, and such methods have led development of speakers for home and industry in recent years.

The term "ultrasonic wave" means a sound wave having a frequency of 20 kHz or more, which is higher than an audible frequency. When a sound signal is carried on an ultrasonic wave and then transferred, a sound source can be obtained which has a stronger intensity and which has directivity.

A speaker which uses the conventional properties of the ultrasonic wave, usually employs a method of amplitude-modulating the sound wave to the ultrasonic wave. An output signal of such speaker is converted to a sound signal in an audible band which can be heard by a person during its transferring procedure by the non-linearity of a medium.

The conventional ultrasonic sound source can send a sound wave over a long distance, or can make a sound wave directed, to a specific point. However, only a small portion of acoustic power of the sound signal carried on the ultrasonic wave is actually transferred, so that a strong output must be used as compared to the typical speaker. Accordingly, a listener is exposed to a portion of a strong ultrasonic wave field. It is thus not suitable as a sound source for a listener as compared to the conventional speaker which only generates a sound signal in the typical audible band.

SUMMARY OF THE INVENTION

It is therefore one aspect of the present invention to provide a sound reproducing screen for an ultrasonic wave converting and reproducing method by suggesting a structure of ultrasonic converting apparatus which separates, from the ultrasonic wave, a transmitted sound signal carried on the ultrasonic wave so as to reproduce the sound signal such that the structure is simple and a conversion efficiency is maximized.

According to one aspect of the present invention, there is provided a sound reproducing screen for an ultrasonic converting and reproducing method, which includes: at least one cell having a predetermined volume and having an oscillation member reflecting a sound signal when an ultrasonic wave carried with the sound signal is incident on the cell; and a screen having a matrix structure in which the cells are continuously distributed.

Preferably, but not necessarily, a size of the screen has a wave size larger than 1, wherein the wave size is a ratio between a diameter of the screen and a wavelength, wherein the sound signal has a frequency of 10 Hz to 10 kHz.

Preferably, but not necessarily, the cell includes a flat and thin elastic member having an elastic property reflecting the sound signal while oscillating in response to the ultrasonic wave when the ultrasonic wave is incident; and a hard net spaced from the elastic member by a predetermined interval, having continuous holes of a network structure, and being disposed in parallel with the elastic member so as to limit a displacement of one side of the oscillation of the elastic member. Further, the elastic member may be a thin film.

Furthermore, a mechanical impedance which is a multiplication of a thickness, density of the thin film and an angular velocity of the ultrasonic wave, is preferably, but not necessarily, substantially equal to an impedance of an air.

The cell according to another exemplary embodiment may include a horn reflecting the sound signal while oscillating in response to the ultrasonic wave when the ultrasonic wave is incident; an elastic shell of a cylinder or dome structure having a displacement at an opposite direction to a direction where the oscillation is propagated, and supporting the horn; a supporting member connected to the horn and the shell and transferring an oscillation of the horn to the shell; and a hard net supporting the shell, and having continuous holes of a network structure disposed in parallel with the elastic member so as to make it possible oscillate the elastic member by the incident ultrasonic wave.

The horn may have a flat and circular disc shape, and the supporting member is preferably, but not necessarily, a rigid body having a straight line shape formed via a center of the disc and a center of the shell.

The cell according to yet another exemplary embodiment of the present invention includes a flat and thin elastic member having an elastic property reflecting the sound signal while oscillating in response to the ultrasonic wave when the ultrasonic wave is incident; a coil winding the elastic member and a predetermined space to induce a current by means of an oscillation of the elastic member so as to make the space specified where a magnetic field is generated and the elastic member is used as one surface; and a diode connected to both terminals of the coil, and limiting an oscillation of the elastic member in response to a direction where a current induced to the coil flows.

The elastic member is preferably, but not necessarily, an elastic membrane.

The cell according to another exemplary embodiment of the present invention includes a data processing section extracting an envelope of the ultrasonic wave from an electrical signal converted from the ultrasonic wave; and an oscillating section receiving the ultrasonic wave and converting it to the electrical signal, and receiving the envelope and converting it to a sound signal to be output.

The oscillating section may include a receiving section receiving the incident ultrasonic wave, converting it to the electrical signal, and outputting the converted signal to the data processing section; and a transmitting section converting the envelope extracted from the data processing section to a sound signal to be output.

Furthermore, the data processing section may include a high pass filter dividing a signal having a predetermined frequency or higher from the electrical signal; a rectifier extracting the envelope from an output of the high pass filter; and a low pass filter dividing a signal having a predetermined frequency or lower from the envelope output from the rectifier, and may further include a first amplifier amplifying the electrical signal by a predetermined gain and outputting it to the high pass filter; and a second amplifier amplifying an output of the low pass filter with a predetermined gain so as to make the output have a desired predetermined value.

The oscillating section includes a flat and thin first film having an elastic property reflecting the sound signal while oscillating in response to the ultrasonic wave when the ultrasonic wave is incident; first and second metallization layers adhered to inside and outside of the first film, inducing an electrical signal in response to the oscillation, and being connected to the data processing section; a flat second film adhered to the second metallization layer and allowing a resonance to occur to the oscillation of the first film; and third and fourth flat metallization layers connected to an output of the data processing section, being formed at inside and outside of a predetermined space so as to form the space at the inside of the second film, and being in parallel with the second film.

In this case, the first film is preferably, but not necessarily, a piezoelectric film, and the second film is preferably, but not necessarily, a polyethylene film.

BRIEF DESCRIPTION OF THE DRAWINGS

The above aspects and/or other aspects of the present invention will become more apparent by describing certain exemplary embodiments of the present invention with reference to the accompanying drawings, in which.

DETAILED DESCRIPTION OF THE EXEMPLARY EMBODIMENTS OF THE INVENTION

Hereinafter, exemplary embodiments of the present invention will be described in detail with reference to accompanying drawings.

Figure 1:
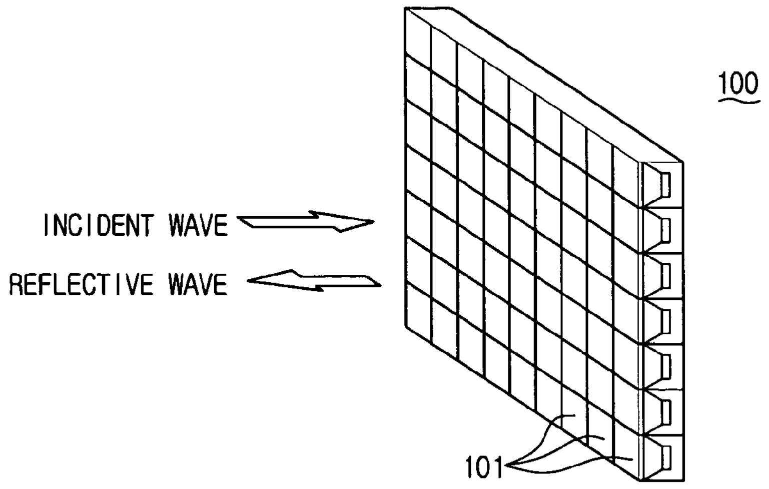
FIG. 1 is a perspective view illustrating a structure of a sound reproducing screen for an ultrasonic wave converting and reproducing method in accordance with an exemplary embodiment of the present invention.

FIG. 1 is a perspective view illustrating a structure of a sound reproducing screen for an ultrasonic wave converting and reproducing method in accordance with an exemplary embodiment of the present invention.

The sound reproducing screen 100 of the exemplary embodiment shown in FIG. 1 is formed to be a screen having a matrix structure, which may be simply referred to as a speaker. The screen 100 operates with at least one set of small ultrasonic sound sources (not shown) which are positioned at different locations on a front of the screen 100 so as to radiate ultrasonic waves to the screen 100.

Signals produced by a non-linear ultrasonic sound source (not shown) are signals in an ultrasonic band which the listener cannot hear, and which include sound signals in an audible band by means of amplitude modulation. The screen 100 has a matrix structure in which a plurality of unit cells 101 is continuously integrated, and each cell 101 has a predetermined width and a predetermined area.

The ultrasonic waves which reach the screen 100 are reflected, and are converted by a rectification operation of each cell 101 of the screen 100. Thus, a reflected sound wave is a rectified sound wave and the reflected sound wave includes a sound signal in an audible band which the listener can hear. In this case, each cell 101 of the screen 100 operates as a rectifier.

The sound signal output from the screen 100 is perceived as if it is transferred from a virtual sound source (not shown) which is positioned behind the screen 100. The reflected sound signal of the audible band maintains phase information included in the incident ultrasonic wave as it is.

The ultrasonic wave including the sound signal, which is reflected by the screen 100, can be produced from at least one device (not shown) and can be directed toward the screen 100.

The cells 101 are mainly classified as being passive devices or active devices.

The cells classified as passive devices and the cells classified as active devices convert an energy of the ultrasonic wave to an energy of the sound signal.

The cells classified as passive devices do not require any energy for the screen itself to operate. An advantage of these passive devices is that the cells 101 of the screen 100 are relatively simple.

The cells classified as active devices require a power for operation. However, power consumption at each cell 101 may be relatively small. And, an advantage of the active devices is that the listener can be prevented from being exposed to an ultrasonic wave having a high intensity.

In addition, the screens 100 of the present invention are classified into screens that operate independently and screens which operate as a whole based on the operation of each cell 101.

Moreover, the screens 100 can be classified into mechanical screens and electromagnetic screens. Further, the screens 100 can be classified into screens that utilize the displacement of the waves for rectification and screens that utilize the velocity of the waves for rectification.

Hereinafter, total operations of the sound reproducing screen 100 of the exemplary embodiment shown in FIG. 1 will be described, and to this end, description will be given assuming that each cell 101 that reflects the ultrasonic signal from an ultrasonic source (not shown) to output a sound signal is regarded as one compact speaker.

The screen 100 ultimately reproduces sound by making each cell 101 in charge of the high frequency band of the sound signal and making the entire screen 100, including all of the cells 101, in charge of the low frequency band of the sound signal. All of the cells 101 are individually operated.

According to the exemplary sound reproducing screen 100 shown in FIG. 1, a realistic sound space can be reproduced, which is generated by a virtual sound source (not shown) which is positioned behind the screen 100. Such an effect is supported by the Huygens-Fresnel principle.

According to the Huygens-Fresnel principle, a virtual sound source (not shown) is present behind the screen 100, and a secondary sound source is generated over the front surface of the screen 100 by the virtual sound source (not shown), which makes the listener hear the sound.

The cells 101 of the screen 100 correspond to the secondary sound source. That is, according to conventional methods, an actual sound source is positioned behind the screen 100 and the virtual secondary sound source is positioned at the front surface of the screen in accordance with the Huygens-Fresnel principle. However, in accordance with exemplary embodiments of the present invention, the virtual sound source is positioned behind the screen 100 and the actual sound source, referred to as the cells 101, is present in the screen 100. When an amplitude and a phase at each cell 101 are properly selected and adjusted, the effect of making the sound source reach the listener becomes the same. The listener can think that the sound signal is delivered from the virtual sound source (not shown) which is present behind the screen 100.

Hereinafter, a size of each cell 101 for making the sound reproducing screen 100 operate as a continuous system will be described. According to the exemplary embodiment shown in FIG. 1, the screen 100 is totally covered by the cells 101. As used in the following discussion, the size of a cell 101 means a width of each cell 101.

A frequency f that the listener can hear is theoretically about 20 kHz. A wavelength corresponding to this frequency can be obtained by dividing a velocity of sound by the frequency f A wavelength w corresponding to the frequency f is about 2 cm.

When the size of the cell 101 is smaller than 1 cm, which is half the size of the wavelength w in accordance with an exemplary embodiment of the present invention, the arrangement of the cells 101 can be regarded as continuous, and an effect due to the individually divided property of the screen 100 can be ignored.

However, the size of 1 cm is substantially small. A threshold value of the substantial audible frequency may be different for different people, however, such a threshold value is extremely low. A frequency less than at least 10 kHz can be regarded as one having information. In this case, the size of the cells 101 becomes about 2 cm.

The screen 100 having a width of 1 cm can operate in a continuous way, and can generate a substantially three-dimensional sound field in all audible frequency bands. Further, it is sufficient to generate the three-dimensional sound when the size of the cells 101 are about 5 to 7 cm.

Hereinafter, operations in the low and middle frequency band of the audible sound signal will be described.

A major difference between generating a sound signal having a low frequency and a sound signal having a middle frequency is associated with the wave size of the speaker, which is a ratio between a diameter and a wavelength of the speaker. When the wave size of a speaker is larger than 1, a sound output of the speaker can be effective.

However, when the wave size of a speaker is less than 1, an efficiency of the sound output of the speaker is poor. An air load applied to the speaker is very low in this case. This is due to the very strong power applied to a very small mass, so that the amplitude of the oscillation is very large and an energy applied to the air load becomes very small.

From a point of view of each cell 101, the wave size of the cell 101 is small as compared to the lower frequencies from 5 kHz to 10 kHz. However, for the measurement of whole operations of the screen 100, the wave size of the screen 100 must be considered, and the wave size of the entire screen 100 is determined differently. When the screen 100 is sufficiently large, the wave size of the screen 100 is sufficient up to about 100 Hz, however, the wave size of the screen 100 is small for frequencies lower than 100 Hz. The value of the wave size of the screen 100 is relatively small, so that an efficiency of the screen 100 in the range from 10 Hz to 100 Hz can be made complete by simply correcting amplitudes of audio channels corresponding to respective cells 101.

Hereinafter, different exemplary embodiments for each cell 101 of the sound reproducing screen 100 will be described in detail.

Figure 2A:
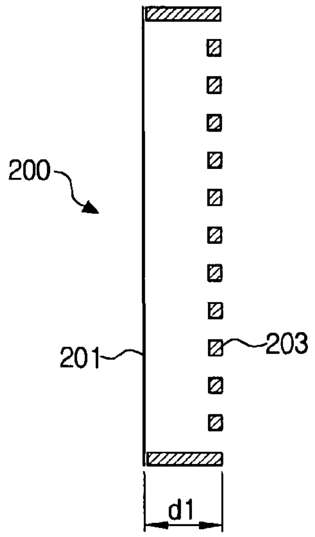
FIG. 2A, FIG. 2B and FIG. 2C are cross-sectional views of each cell of a sound reproducing screen for an ultrasonic wave converting and reproducing method in accordance with an exemplary embodiment of the present invention.
Figure 2B:
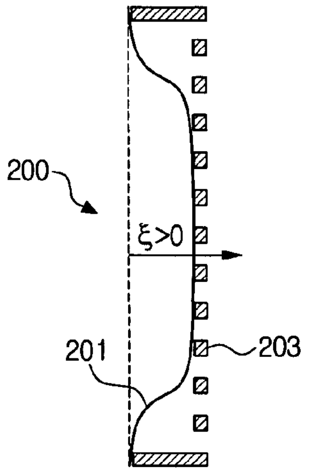
Figure 2C:
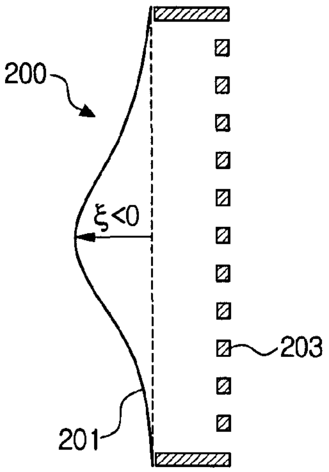

FIG. 2A, FIG. 2B and FIG. 2C are cross-sectional views of each cell of the sound reproducing screen for an ultrasonic wave converting and reproducing method in accordance with an exemplary embodiment of the present invention.

Referring to FIG. 2A, FIG. 2B and FIG. 2C, the sound reproducing screen 100 is also referred to as a film-net (FN) device, which is a passive system in which each cell 200 is discrete and operates in a mechanical way and does not depend on an external power supply. Each cell 200 does not have a separate speaker inside. Further, each cell 200 receives the external sound carried on the ultrasonic wave directed toward the front of the screen 100, and makes only the sound signal reflected by the screen 100. FIG. 2A, FIG. 2B and FIG. 2C show a cross-sectional view of the cell 200.

Hereinafter, operations and properties of respective components of the exemplary embodiment shown in FIG. 2A, FIG. 2B and FIG. 2C will be described. Referring to FIG. 2A, each cell 200 of the sound reproducing screen 100 includes a hard net 203 which has a thin film 201 on its front and includes continuous holes of a net structure spaced by a predetermined interval d1. The thin film 201 is preferably, but not necessarily, a polymer film.

When an ultrasonic wave as an incident wave is delivered toward the film 201 of the cell 200, the film 201 oscillates in response to the incident wave. As shown in FIG. 2C, when the incident wave pulls the film 201 from the net 203, the film 201 freely moves. And, as shown in FIG. 2B when the incident wave pushes the film 201 toward the net 203, the net 203 is so hard that the net 203 is not moved by the film 201, thereby limiting the displacement $\xi$ of the film 201 on the side of the net 203.

The oscillation of the film 201 can generate a reflective wave. Obviously, the response of the film 201 is non-linear, so that the reflective wave includes a non-linear component.

The operation of the cell 200 including the film 201 and the net 203 is similar to a diode, so that it can rectify the displacement $\xi$ of the incident wave. The incident wave can be regarded as a wave which has been amplitude-modulated. Graphs of the displacements $\xi$ of the incident wave and the reflective wave are shown in FIG. 3.

Figure 3A:
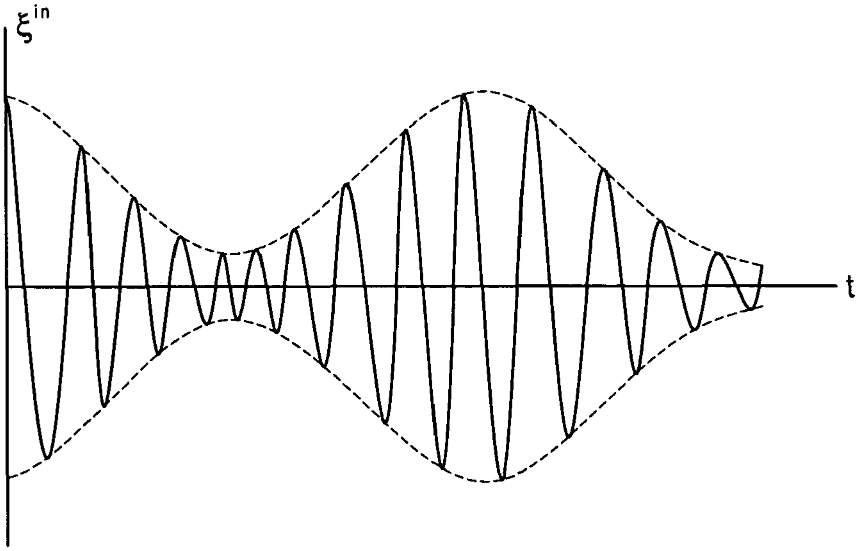
FIG. 3A and FIG. 3B are graphs illustrating displacements 4 of an incident wave and a reflected wave of the exemplary sound reproducing screen using a polymer film of FIG. 2.
Figure 3B:
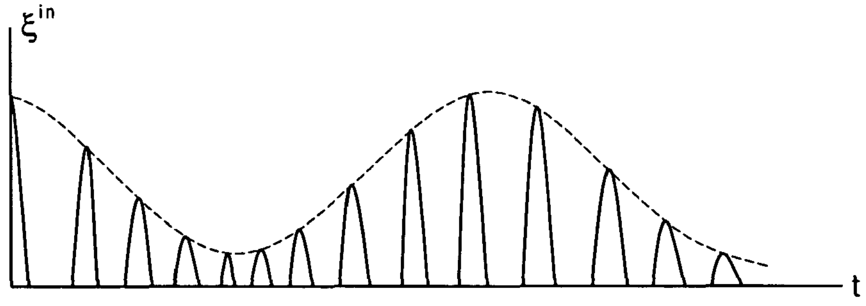

FIG. 3A and FIG. 3B show graphs illustrating displacements 4 of the incident wave and the reflective wave of the sound reproducing screen 100 which uses the polymer film of FIG. 2. FIG. 3A represents the displacement $\xi$ of the incident wave, and FIG. 3B represents the displacement $\xi$ of the reflective wave. The horizontal axes of FIG. 3A and FIG. 3B denote a time and the vertical axes denote respective angular displacement $\xi$.

Referring to FIG. 3A, it can be seen that the sound signal having a low frequency is amplitude-modulated to an ultrasonic wave having a high frequency. FIG. 3B shows the rectified wavelength as the displacement on the side of the net 203 of the film 201 is limited.

The reflective wave includes a low frequency component. When the incident wave $\xi^{in}$ displayed using a displacement is the same as Equation 1 below, an amplitude of the low frequency component can be $A_\Omega=A_\omega/\pi$. In this case, $\pi$ is a circle ratio, and $A_\omega$ is an amplitude of the incident wave.

$$\xi^{in}=A_\omega(\sin(\omega+\Omega)t+\sin_\omega t) \quad \text{Equation 1}$$

In this case, $\Omega$ is an angular velocity of the reflective wave, and $\omega$ is an angular velocity of the incident wave. Accordingly, the frequency f of the incident wave is as follows: $f=\omega/(2\pi)=40$ kHz, and the frequency F of the low frequency component is as follows: $F=\Omega/(2\pi)=$about 1 kHz.

The reflective wave of the sound reproducing screen 100 of FIG. 2A plays the same role as the speaker of each cell 101 of FIG. 1, and the sound reproducing screen 100 of FIG. 2A operates in the same manner as that shown in FIG. 1. Subsequent operations are also the same as those discussed with respect to FIG. 1.

The film 201 oscillates with an ultrasonic wave and has the same amplitude as the amplitude of the oscillation of the ultrasonic wave. To this end, the film 201 must be sufficiently light.

To determine whether the film 201 is light in a given circumstance, a mechanical impedance of the film 201 can be calculated for comparison with an impedance of air. When the impedance of the film 201 is close to the impedance of the air, it means that there is no damping due to the material of the film 201.

When a thickness h of the film 201 is $2\times10^{-6}$m, an impedance of the film $Z_f$ can be calculated as Equation 2 below.

$$Z_f=\frac{p}{u}=\frac{p\omega}{a}=\rho_f h_\omega \quad \text{Equation 2}$$

In this case, p denotes a pressure, u denotes a velocity, a denotes an acceleration, $\omega$ denotes an angular velocity of the incident wave, and $\rho_f$ denotes a density of the film. When the density $\rho_f$ of the film is, for example, $10^3$ kg/m$^3$, $Z_f$ becomes an impedance of $5\times10^2$ Pa*s/m, which is close to an impedance of the air, and can thus be selected as a proper film.

The net 203 has a lattice form, which has a series of continuous holes, and the film 201 can oscillate when a size of the acoustic boundary layer is smaller than the holes of the net 203. In contrast, when the size of the acoustic boundary layer is larger than the holes of the net 203, the net 203 acts as a wall.

The acoustic boundary layer $\delta$ is calculated by Equation 2 below, and the holes of the net 203 must be larger than $\delta$.

$$\delta=\sqrt{\frac{\eta}{\rho_o\omega}}. \quad \text{Equation 4}$$

In this case, co denotes an angular velocity of the incident wave, $\eta$ denotes a dynamic viscosity of the air and has a value of $3\times10^{-5}$ kg/ms, and $\rho_0$ denotes a density of the air. Accordingly, $\delta$ becomes about $10^{-5}$ m.

To sum up, the sound reproducing screen 100 of FIG. 2 can be implemented by the hard net 203, which has the film 201 with a thickness smaller than about 2 microns and holes larger than about $10^{-5}$ m. An interval between the film 201 and the net 203 must be smaller than the displacement of the wave in the ultrasonic wave.

Figure 4A:
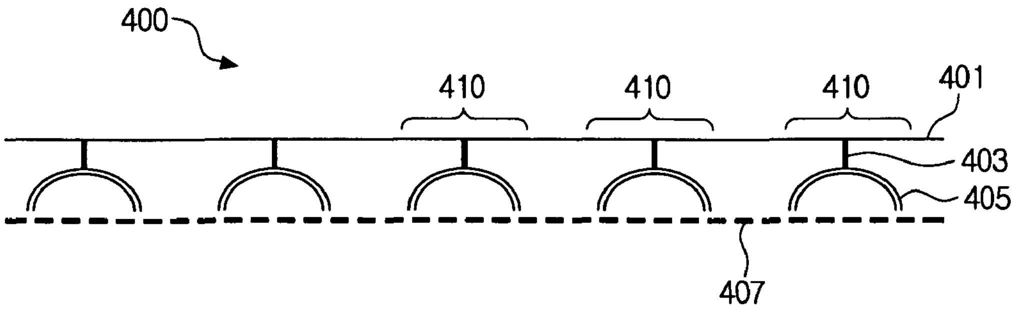
FIG. 4A, FIG. 4B and FIG. 4C illustrate a portion of a cross-sectional view of a sound reproducing screen for an ultrasonic wave converting and reproducing method in accordance with another exemplary embodiment of the present invention.
Figure 4B:
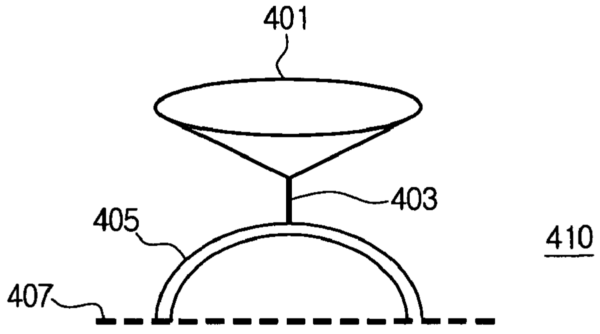
Figure 4C:
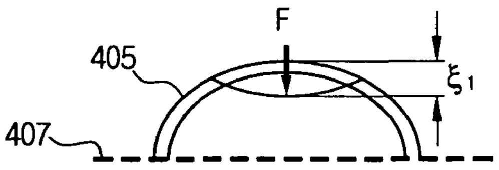

FIG. 4A, FIG. 4B, and FIG. 4C illustrate a portion of a cross-sectional view of a sound reproducing screen for an ultrasonic wave converting and reproducing method in accordance with another exemplary embodiment of the present invention. FIG. 4A shows a portion of the sound reproducing screen 400 and FIG. 4B shows each cell 410 of the screen 400 in accordance with the another exemplary embodiment of the present invention.

FIG. 4C is a view for explaining a movement of the shell 405 included in each cell 410, which shows that the shell 405 is moved by the displacement $\xi_1$ when a power resulting from the incident ultrasonic wave is delivered to a vertex of the semicircle shell 405, which has a dome structure.

The sound reproducing screen 400 of FIG. 4A is configured such that a plurality of cells 410 is arranged in a lattice shape to form an entire screen. Each cell 410 has a circular disc-shaped horn 401 at its front, and the shell 405, which comprises a semicircle elastic member having a dome structure, is disposed at a rear side of the horn 401. Further, the horn 401 and the shell 405 are connected to each other by a supporting member 403 as a rigid body having a needle shape. A net 407, which has a series of connected holes, is formed at the rear side of the shell 405.

The horn 401 is for acoustic impedance matching, and can be implemented as a flat metal disc. An impedance matching is also required between the horn 401 as a non-linear element and the air, as is the same case with the impedance of the film 201.

The disc-shaped horn 401 must have a size corresponding to the wavelength of the air so as to operate as an effective transmitter or receiver. The resonance frequency of the disc-shaped horn 401 must be the same as the ultrasonic wave frequency (o as the carrier. An output impedance of the disc-shaped horn 401 can be obtained by a ratio between a force applied to the supporting member 403 and an oscillation velocity, which is shown as Equation 4 below:

$$Z=\frac{F}{u}\sim Z_o S \quad \text{Equation 4}$$

In this case, F denotes a force applied to the supporting member 403, u denotes an oscillation velocity, $Z_o$ denotes an impedance of the air, and S denotes an area of the horn 401.

The shell 405 forms a surface, which has a non-linear elastic property, to divide the sound signal carried on the ultrasonic signal. The displacement $\delta_1$ of the shell 405 is a secondary function to a pressure, which gives a secondary non-linear response. The shell 405 may be a shape other than dome-shaped, and may have an elastic cylinder structure.

The supporting member 403 may be a straight line connecting a center of the shell 405 and the horn 401. Moreover, the supporting member 403 may have a structure such that it is connected to at least one point of a periphery of the horn 401 and such that at least one supporting part extended from the supporting member 403 forms a triangular pyramid, and such that the supporting member 403 extended again from the vertex of the triangular pyramid is connected to the shell 405. The straight line connected to the shell 405 of the supporting member 403 while passing through the center of the horn 401 and the vertex of the triangular pyramid is orthogonal to the net 407 toward the center of the horn 401.

The sound reproducing screen of FIG. 4A, FIG. 4B, and FIG. 4C is operated by the similar principle as the FN device of FIG. 2. The horn 401 is connected to the shell 405 as the non-linear element. The shell 405 gives a non-linear response between the sound pressure P and the displacement $\xi_1$. By means of the non-linear property of the displacement $\xi_1$, the reflective wave includes a modulated frequency $\Omega$.

Figure 5:
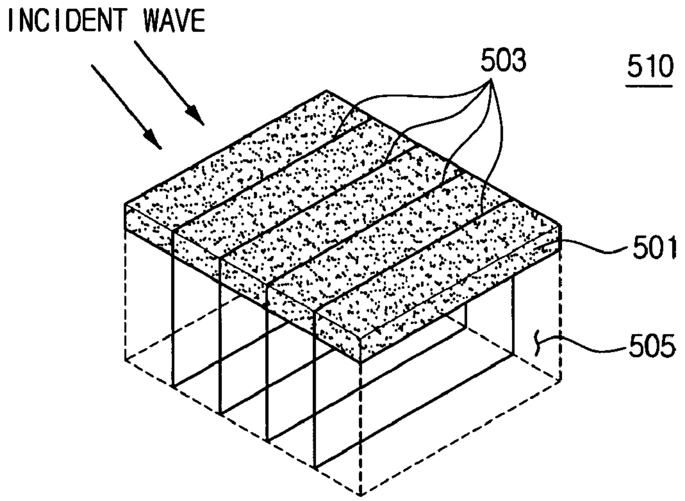
FIG. 5 is a perspective view of unit cell of a sound reproducing screen for an ultrasonic wave converting and reproducing method in accordance with yet another exemplary embodiment of the present invention.

FIG. 5 is a perspective view of a unit cell 510 of a sound reproducing screen for an ultrasonic wave converting and reproducing method in accordance with yet another exemplary embodiment of the present invention.

The sound reproducing screen using the cell 510 of FIG. 5 as a unit structure utilizes an electromagnetic induction phenomenon.

The cell 510 is positioned within a magnetic field, and an elastic and thin film 501 is covered on a front surface of the space 505, which is a predetermined hexagonal shape and is filled with air. Further, the coil 503 is wound by a method of winding the space 505 and the film 501, and both ends of the coil 503 are connected to a diode as a semiconductor (not shown).

The cell 510 is positioned within the magnetic field, and an electromagnetic field is induced to the coil 503, which oscillates together when the film 501 oscillates by means of the incident ultrasonic wave. When the electromagnetic field is forward-biased for the diode (not shown), currents flow along the coil 503, and these currents dampen the oscillation of the film 501. When the currents flow in the opposite direction, the film 501 moves in a free manner. Accordingly, the oscillation velocity of the film 501 is rectified. In this case, the film 501 must be sufficiently light.

An alternative of the exemplary embodiment of FIG. 5 may further have a film (not shown) disposed on the film 501 and spaced by a predetermined interval from the film 501. In this case, the interval between the two films is adjusted so as to make a resonance occur by means of the two films in response to the frequency $\omega$ of the incident ultrasonic wave.

Figure 6A:
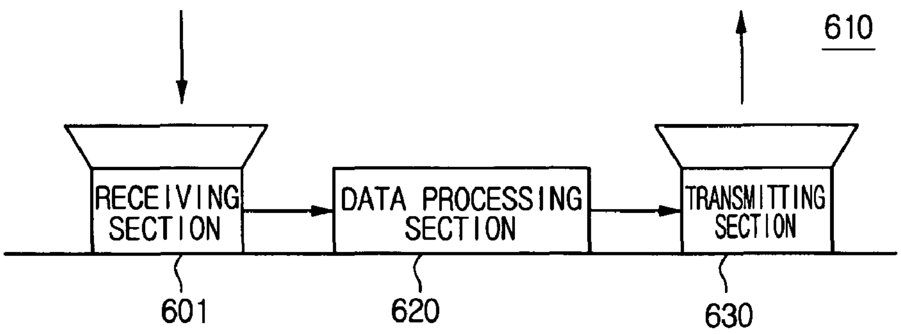
FIG. 6A and FIG. 6B are block views of unit cell of a sound reproducing screen for an ultrasonic wave converting and reproducing method in accordance with yet another exemplary embodiment of the present invention.
Figure 6B:
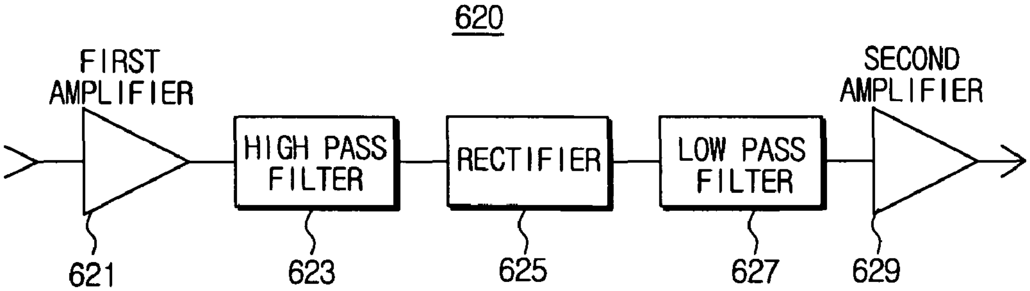

FIG. 6A and FIG. 6B are block views of unit cell of a sound reproducing screen by an ultrasonic wave converting and reproducing method in accordance with yet another exemplary embodiment of the present invention.

FIG. 6A shows the unit cell 610 in accordance with yet another exemplary embodiment of the present invention. The unit cell 610 includes a receiving section 601, which receives the incident wave as the ultrasonic wave, a data processing section 620, and a transmitting section 630, which outputs the rectified sound signal.

FIG. 6B shows the data processing section 620, which includes a first amplifier 621, a high pass filter 623, a rectifier 625, a low pass filter 627, and a second amplifier 629.

The high pass filter 623 and the low pass filter 627 act to prevent a positive feedback between the input and the output of the signal. The high pass filter 623 only passes signals having a predetermined frequency or higher, and preferably, but not necessarily, filters signals having about 30 kHz or higher. The low pass filter 627 filters the signals of the audible frequency band, and preferably, but not necessarily, passes frequency signals lower than about 10 kHz.

The rectifier 625 operates as a non-linear element and tracks and detects an envelope of the signal incident through the receiving section 601. Accordingly, the signal incident through the receiving section 601 detects the envelope of the signal incident through the data processing section 620, and amplifies it to a proper output level to be output to the transmitting section 630.

Figure 7:
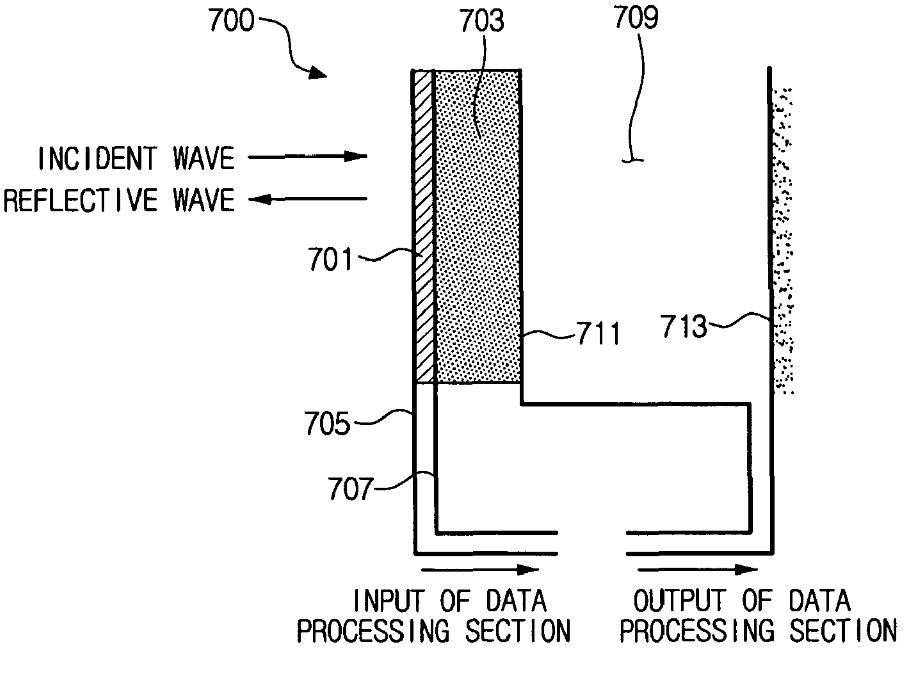
FIG. 7 is a cross-sectional view illustrating another exemplary embodiment of unit cell of the sound reproducing screen of FIG. 6.

An exemplary alternative of FIG. 6A and FIG. 6B may be implemented with an oscillating section (not shown), which has the receiving section 601 and the transmitting section 630 as one device, and an example of such an alternative is shown in FIG. 7.

FIG. 7 is a cross-sectional view illustrating another exemplary embodiment of a unit cell of the sound reproducing screen of FIG. 6.

Referring to FIG. 7, the receiving section 601 and the transmitting section 630 are formed as an oscillating section 700 as one structure. The oscillating section 700 has a first film 701 with a predetermined thickness, and first and second metallization layers 705 and 707, which are formed outside and inside of the first film 701, respectively. A second film 703 for forming an oscillation mode is disposed inside the second metallization layer 707. The first film 701 is preferably, but not necessarily, formed of a piezoelectric film, and the second film 703 is preferably, but not necessarily, formed of a polyethylene film.

A space 709 which is filled with an air is formed inside the second film 703, and an outside and an inside of the space 709 are surrounded by third and fourth metallization layers 711 and 713, respectively. The first and second metallization layers 705 and 707, which surround the first film 701, are connected to the data processing section 620, which corresponds to an output of the receiving section 601. In addition, the third and fourth metallization layers 711 and 713, which surround the space 709, are connected to an output of the data processing section 620, which corresponds to the transmitting section 630.

Oscillation resulting from the ultrasonic wave incident on the first film 701 causes a voltage to the first and second metallization layers 705 and 707 of the oscillating section 700. This voltage is processed in the data processing section 620 as a sound signal, and a voltage signal having a low frequency output from the data processing section 620 is delivered to the third and fourth metallization layers 711 and 713. The first and second films 701 and 703, the space 709, and the fourth metallization layer 713 operate in the same manner as the condenser output speaker.

By means of the above-described method, the sound reproducing screen for the ultrasonic converting and reproducing method according to an exemplary embodiment of the present invention is operated.

According to exemplary embodiments of the present invention as described above, the following effects can be obtained.

First, a sound reproducing screen consistent with the present invention can make most of the sounds that are delivered to an arbitrary constant region among the entire space where the sound is spread. As a result, the listener can perceive a three-dimensional sound field, much like the actual sound, in front of the listener or behind the listener.

In addition a virtual sound field can have a very high spatial resolution, that is, by means of a sound reproducing screen consistent with the present invention, each position of each instrument of one band can be represented.

Second, a speaker consistent with the present invention can produce a specific sound effect such as the virtual sound source.

Third, consistent with the present invention, a significant property can be obtained in generating a low frequency region of the sound spectrum.

Fourth, a sound reproducing screen consistent with the present invention can be manufactured with a very simple structure, and can be manufactured as thin as a wall paper, so that ease of installment and management can be ensured. A sound reproducing screen consistent with the present invention can also be utilized as a video screen in response to a material of the screen. In this case, viewers can hear the sound correctly output from positions of the sound sources that they see such as an automobile and an animal.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A sound reproducing screen comprising:

at least one cell having a predetermined volume and comprising an oscillation member which reflects a sound signal when an ultrasonic wave, which is carried with the sound signal, is incident on the cell; and a screen having a matrix structure in which cells are continuously distributed, wherein the cell includes:

a flat and thin elastic member having an elastic property, wherein the elastic member reflects the sound signal while oscillating in response to the ultrasonic wave when the ultrasonic wave is incident; and a hard net which is spaced from the elastic member by a predetermined interval, wherein the hard net comprises continuous holes of a network structure, and wherein the hard net is disposed in parallel with the elastic member so as to limit a displacement of one side of the oscillation of the elastic member wherein the elastic member comprise a thin film, wherein the mechanical impedance of the thin film is substantially equal to an impedance of air, wherein the mechanical impedance of the thin film is equal to a thickness of the thin film multiplied by a density of the thin film multiplied by an angular velocity of the ultrasonic wave.

2. A sound reproducing screen comprising:

at least one cell having a predetermined volume and comprising an oscillation member which reflects a sound signal when an ultrasonic wave, which is carried with the sound signal, is incident on the cell; and a screen having a matrix structure in which cells are continuously distributed wherein the cell comprises:

a horn which reflects the sound signal while oscillating in response to the ultrasonic wave when the ultrasonic wave is incident;

an elastic shell of a cylinder or a dome structure, wherein the elastic shell supports the horn, wherein the elastic shell has a displacement in a direction opposite to a direction in which the oscillation of the horn is propagated;

a supporting member which is connected to the horn and to the elastic shell, wherein the supporting member transfers an oscillation of the horn to the elastic shell; and a hard net which supports the elastic shell, wherein the hard net comprises continuous holes of a network structure which are disposed so as to oscillate the elastic shell by the incident ultrasonic wave.

3. The sound reproducing screen according to claim 2, wherein the horn has a flat shape and a circular disc shape.

4. The sound reproducing screen according to claim 3, wherein the supporting member comprises a rigid body having a straight line shape, wherein the supporting member is connected to a center of the horn, and wherein the supporting member is connected to a center of the elastic shell.

5. A sound reproducing screen comprising:

at least one cell having a predetermined volume and comprising an oscillation member which reflects a sound signal when an ultrasonic wave, which is carried with the sound signal, is incident on the cell; and a screen having a matrix structure in which cells are continuously distributed wherein the cell comprises:

a flat and thin elastic member having an elastic property, wherein the elastic member reflects the sound signal while oscillating in response to the ultrasonic wave when the ultrasonic wave is incident;

a coil formed by winding the elastic member and a predetermined space, wherein a current is induced to the coil by means of an oscillation of the elastic member, and wherein a magnetic field is generated in the predetermined space; and a diode connected to both terminals of the coil, wherein the diode limits an oscillation of the elastic member in response to a direction in which a current induced to the coil flows.

6. The sound reproducing screen according to claim 5, wherein the elastic member comprises an elastic membrane.

7. A sound reproducing screen comprising:

at least one cell having a predetermined volume and comprising an oscillation member which reflects a sound signal when an ultrasonic wave, which is carried with the sound signal, is incident on the cell; and a screen having a matrix structure in which cells are continuously distributed wherein the cell comprises:

a data processing section which extracts an envelope of the ultrasonic wave from an electrical signal which is converted from the ultrasonic wave; and an oscillating section which receives the ultrasonic wave, converts the ultrasonic wave to the electrical signal, and receives the envelope and converts the envelope to a sound signal to be output.

8. The sound reproducing screen according to claim 7, wherein the oscillating section comprises:

a receiving section which receives the incident ultrasonic wave, converts the ultrasonic wave to the electrical signal, and outputs the electrical signal to the data processing section; and a transmitting section which converts the envelope, which is extracted by the data processing section, to a sound signal to be output.

9. The sound reproducing screen according to claim 7, wherein the data processing section comprises:

a high pass filter which divides a signal having a predetermined frequency or higher from the electrical signal;

a rectifier which extracts the envelope from an output of the high pass filter; and a low pass filter which divides a signal having a predetermined frequency or lower from the envelope output from the rectifier.

10. The sound reproducing screen according to claim 9, wherein the data processing section further comprises:

a first amplifier which amplifies the electrical signal by a predetermined gain, and outputs the electrical signal to the high pass filter; and a second amplifier which amplifies an output of the low pass filter by a predetermined gain so as to make the output of the low pass filter have a desired predetermined value.

11. The sound reproducing screen according to claim 7, wherein the oscillating section comprises:

a flat and thin first film having an elastic property, wherein the first film reflects the sound signal while oscillating in response to the ultrasonic wave when the ultrasonic wave is incident;

a first metallization layer and a second metallization layer which are adhered to an outside and an inside of the first film, respectively, wherein the first metallization layer and the second metallization layer induce an electrical signal in response to the oscillation of the first film, and the first metallization layer and the second metallization layer are connected to the data processing section;

a flat second film which is adhered to the second metallization layer and allows a resonance to occur to the oscillation of the first film; and a third metallization layer and a fourth metallization layer which are connected to an output of the data processing section, which are formed at an outside and an inside of a predetermined space so as to form the predetermined space at the inside of the second film, wherein the third metallization layer and the fourth metallization layer are in parallel with the second film.

12. The sound reproducing screen according to claim 11, wherein the first film comprises a piezoelectric film.

13. The sound reproducing screen according to claim 11, wherein the second film comprises a polyethylene film.

* * * * *